Patented June 12, 1923.

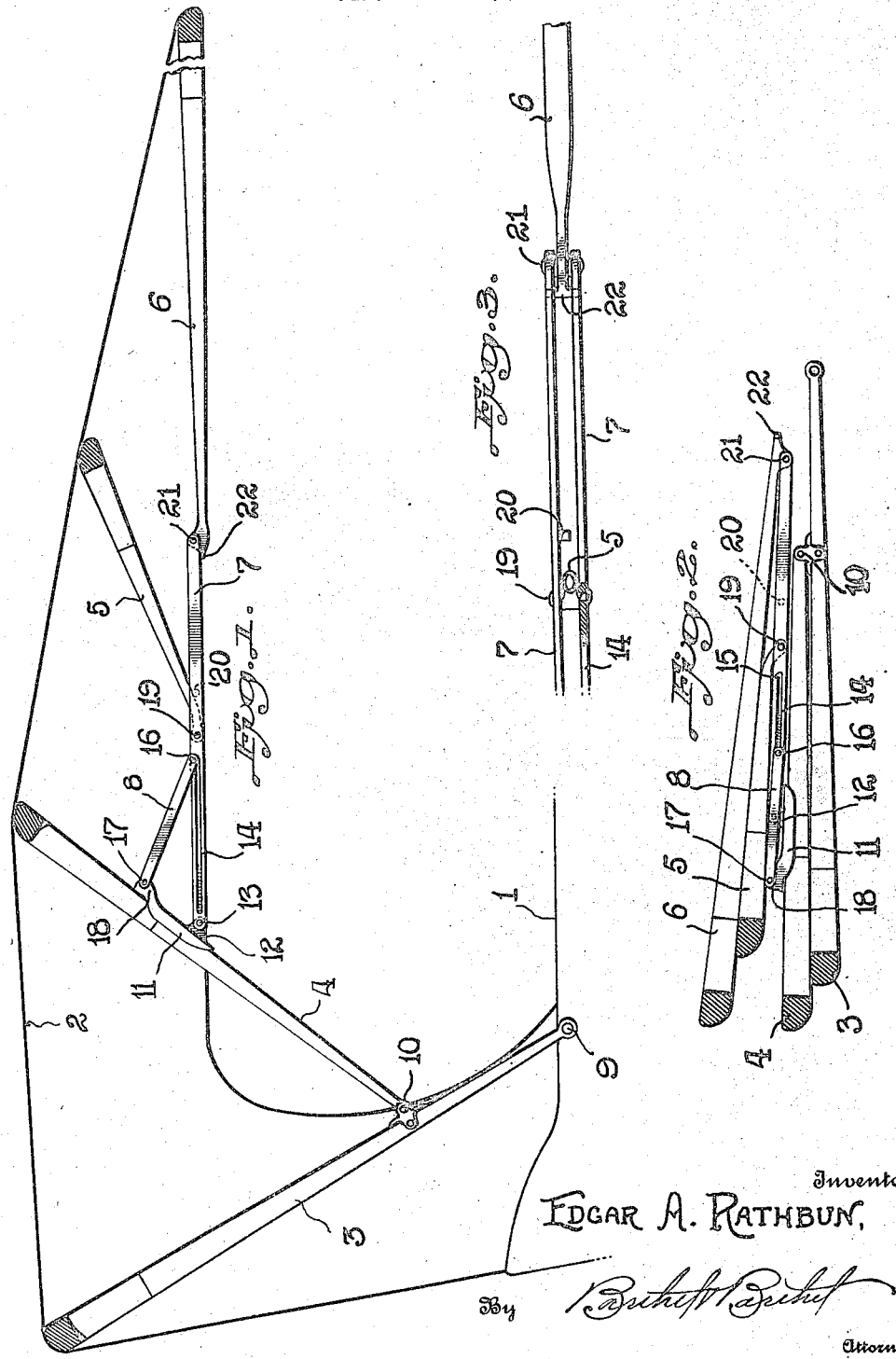

1,458,242

UNITED STATES PATENT OFFICE.

EDGAR A. RATHBUN, OF PONTIAC, MICHIGAN, ASSIGNOR TO AMERICAN FORGING AND SOCKET CO., OF PONTIAC, MICHIGAN, A CORPORATION OF MICHIGAN.

VEHICLE TOP.

Application filed November 26, 1920. Serial No. 426,482.

*To all whom it may concern:*

Be it known that I, EDGAR A. RATHBUN, a citizen of the United States of America, residing at Pontiac, in the county of Oakland and State of Michigan, have invented certain new and useful Improvements in Vehicle Tops, of which the following is a specification, reference being had therein to the accompanying drawings.

My invention aims to provide a vehicle top framework consisting of comparatively few bows which may be easily and quickly manipulated, to collapse the top framework or to extend the framework, and in either position the various bows are firmly held against accidental displacement.

My invention further aims to provide a vehicle top framework which when in an extended or raised position provides a rigid and durable structure on which a canopy or cover may be supported without subjecting the canopy or cover to stresses or strains by the set up parts of the framework. The constructive arrangement of the various bows and members of the framework is such that stream lines may be retained in connection with the design of the top and full or unobstructed vision obtained from within an automobile provided with the top.

My invention still further aims to provide a vehicle top framework having a rear bow, front bow, outrigger bow, intermediate bow, side arms and links with these elements articulated so that a canopy or cover will not be injured when the various bows are folded or collapsed, so, also, that manipulation of the outrigger bow and the arms will cause the remaining bows to assume active or inactive positions.

The construction of the vehicle or top framework will be hereinafter described and then claimed, and reference will now be had to the drawing, wherein Figure 1 is a central longitudinal sectional view of the vehicle top framework, showing the framework raised or extended;

Fig. 2 is a similar view showing the framework folded or collapsed, and

Fig. 3 is a plan of a portion of side arms forming part of the top framework.

In the drawing, the reference numeral 1 denotes a portion of an automobile body adapted to have a cover or canopy 2 supported over the body and for this purpose a series of bows are articulated to form a framework which is supported adjacent the rear end of the body 1, and may be held in a set up or extended position by the usual back stay, windshield and other devices not shown and not forming any part of this invention.

The framework comprises a rear bow 3, a front bow 4, an intermediate bow 5, an outrigger bow 6, sets of arms 7 supporting the intermediate bow and connecting the outrigger bow to the front bow, and links 8 supporting the sets of arms 7 relative to the front bow.

The rear bow 3 may be inclined rearwardly from its pivotal connection 9 with the body 1, and the front bow 4 may be inclined forwardly and pivotally connected as at 10, to the rear bow 3 so as to be folded or collapsed substantially into parallelism with the rear bow.

The front bow 4 has each side thereof provided with pieces of hardware 11 and each piece of hardware has its lower end provided with a central apertured lug or ear 12 to which are pivotally connected the rear ends of the arms 7, said arms being disposed at the sides of the lug or ear 12 and retained in engagement therewith by a pivot pin 13. The innermost arm 7 has its inner end provided with a longitudinal slot 14 and the forward end of the slot terminates in an offset portion or pocket 15 adapted to receive a stud or pivot pin 16 on the outer end of the link 8, said link having its rear end pivotally connected, as at 17 to a side lug or ear 18 at the upper end of the piece of hardware 11.

The intermediate bow 5 has each end thereof pivotally mounted between the arm 7, as at 19, and said intermediate bow is adapted to be supported at an acute angle relative to the set of arms 7 by an inwardly pin or lug 20, carried by the outermost arm.

The outrigger bow 6 has its ends pivotally mounted, as at 21, between the arms 7 of each set, and each end of the outrigger bow has a cross head 22 to engage under the arms 7 and support the outrigger bow 6 practically in the same horizontal plane as the arms 7 when the framework is set up or extended. The connection between the ends of the outrigger bow 6 and the arms 7 serves practically the same purpose as rule joints, since the outrigger bow 6 can only be swung upwardly relative to the arms 7 and is prevented from being lowered by the crossheads 22 engaging under the arms 7.

The manner of connecting the arms 7 and the links 8 to the front bow 4 permits of the sets of arms 7 being swung downwardly in substantial parallelism with the front bow after the studs or pins 16 of the links 8 are moved out of the pockets 15 into the slots 14, when the studs or pins 16 may slide in the slots 14 and carry the links 8 downwardly in proximity to the pieces of hardware 11 on the front bow 4. It is apparent that the intermediate bow 5 may be swung rearwardly to rest on the arms 7 and occupy a position in proximity to the front bow 4. The outrigger bow 6 may have a similar movement imparted thereto so that the outrigger bow will rest substantially on the intermediate bow 5, and as brought out in Fig. 2, all of the bows are compactly held when the top framework is collapsed.

In raising or extending the top framework the studs or pins 16 of the links 8 automatically ride into the pockets 15 and rigidly hold the sets of arms 7 relative to the front bow 4, it then being possible to swing the intermediate and outrigger bows to extended position as shown in Fig. 1.

I attach considerable importance to the simplicity of construction entering into my invention, since there is a minimum number of parts to accomplish the desired rigidity in connection with a vehicle top, and while I have herein used the term "bows" it is to be understood that each bow includes the usual sockets, fasteners and such other devices as will contribute to proper support of the cover or canopy on the framework. Furthermore, it is to be understood that the various bows will be proportioned relative to each other for proper folding and also for retaining a top cover of desired design properly set relative to the body 1. The framework is also susceptible to such changes or modifications as are permissible by the appended claims.

What I claim is:—

1. A vehicle top framework comprising a front bow, pieces of hardware carried thereby, a set of parallel arms pivotally connected to each piece of hardware, the inner arm of each set being slotted, a lug carried by the outer arm of each set, an intermediate bow having its ends pivotally mounted between the arms of each set and adapted to rest on the lugs of the outer arms, an outrigger bow pivotally connected to said sets of arms, and means carried by said pieces of hardware and having a sliding connection with the inner slotted arm of each set of arms, and adapted to support the sets of arms relative to said front bow.

2. A vehicle top framework as in claim 1, characterized by said means including links having studs slidable in the inner slotted arm on each set.

3. A vehicle top framework comprising a rear bow, a front bow pivotally connected thereto, pieces of hardware on said front bow, sets of arms pivotally connected to the lower end of each piece of hardware, the inner arm of each set having a slot terminating in a pocket, links pivotally connected to the upper ends of said pieces of hardware, studs carried by the outer ends of said links and slidable in the slots of the inner arms and adapted to engage in the pockets thereof, and an outrigger bow having its ends pivotally mounted in the outer ends of said sets of arms.

4. A vehicle top framework as in claim 3, characterized by an intermediate bow having its ends supported between the arms of each set and between the link connection with said arms and the outrigger bow connection with said arms.

In testimony whereof I affix my signature in presence of two witnesses.

EDGAR A. RATHBUN.

Witnesses:
ANNA M. DORR,
CHAS. W. STAUFFIGER.